United States Patent [19]
Weiss

[11] 3,920,544
[45] Nov. 18, 1975

[54] PROCESS AND INSTALLATION FOR THE TREATMENT OF WATER AND OTHER LIQUIDS

[75] Inventor: Herbert Weiss, Gundelfingen, Germany

[73] Assignee: Abwassertechnik und Kunststoffbau GmbH, Waiblingen, Germany

[22] Filed: June 12, 1973

[21] Appl. No.: 369,144

[30] Foreign Application Priority Data
June 13, 1972 Germany............................ 2228657

[52] U.S. Cl.................... 210/25; 210/33; 210/142; 210/189; 210/190
[51] Int. Cl.²......................................... B01D 15/02
[58] Field of Search............ 210/25, 33, 88, 94, 95, 210/96, 142, 189–191, 264

[56] References Cited
UNITED STATES PATENTS

| | | | |
|---|---|---|---|
| 1,688,915 | 10/1928 | Astrom........................... | 210/189 X |
| 1,910,004 | 5/1933 | De Ville........................... | 210/95 X |
| 2,348,854 | 5/1944 | Schreiber......................... | 210/33 X |
| 2,628,192 | 2/1953 | Ziegelman........................ | 210/189 |
| 3,220,552 | 11/1965 | Staats............................... | 210/189 X |
| 3,288,426 | 11/1966 | Entringer......................... | 210/189 X |
| 3,482,697 | 12/1969 | Tremont et al................. | 210/190 X |
| 3,565,798 | 2/1971 | Barnes.............................. | 210/33 X |
| 3,570,520 | 3/1971 | Sodi.................................. | 210/88 X |
| 3,580,842 | 5/1971 | Higgins............................. | 210/33 X |
| 3,674,685 | 7/1972 | Arden et al...................... | 210/33 |
| 3,676,336 | 7/1972 | O'Brien et al. ................. | 210/25 |

FOREIGN PATENTS OR APPLICATIONS

| | | |
|---|---|---|
| 234,605 | 7/1964 | Germany |
| 1,816,658 | 7/1970 | Germany |

*Primary Examiner*—Frank A. Spear, Jr.
*Assistant Examiner*—Robert G. Mukai
*Attorney, Agent, or Firm*—Haseltine, Lake & Waters

[57] ABSTRACT

A process and installation for the treatment, particularly softening, partially or fully desalting water, aqueous solutions, acids and the like, in which the liquid being treated is conducted through a resinous-bed ion exchanger, and in which the partially exhausted ion exchanger resin is removed from the bed in charges, regenerated by passing a regenerating material through the charge and re-entrained in the bed. A liquid which is to be treated is conducted at a vertical motion component from above downwardly into the inflow end, and with a vertical motion component from the bottom upwardly out of the outflow end of the resinous-bed ion exchanger, and in which the charges during the liquid treatment are removed from the bed at its outflow end and re-entrained at its inflow end.

12 Claims, 1 Drawing Figure

U.S. Patent  Nov. 18, 1975  3,920,544
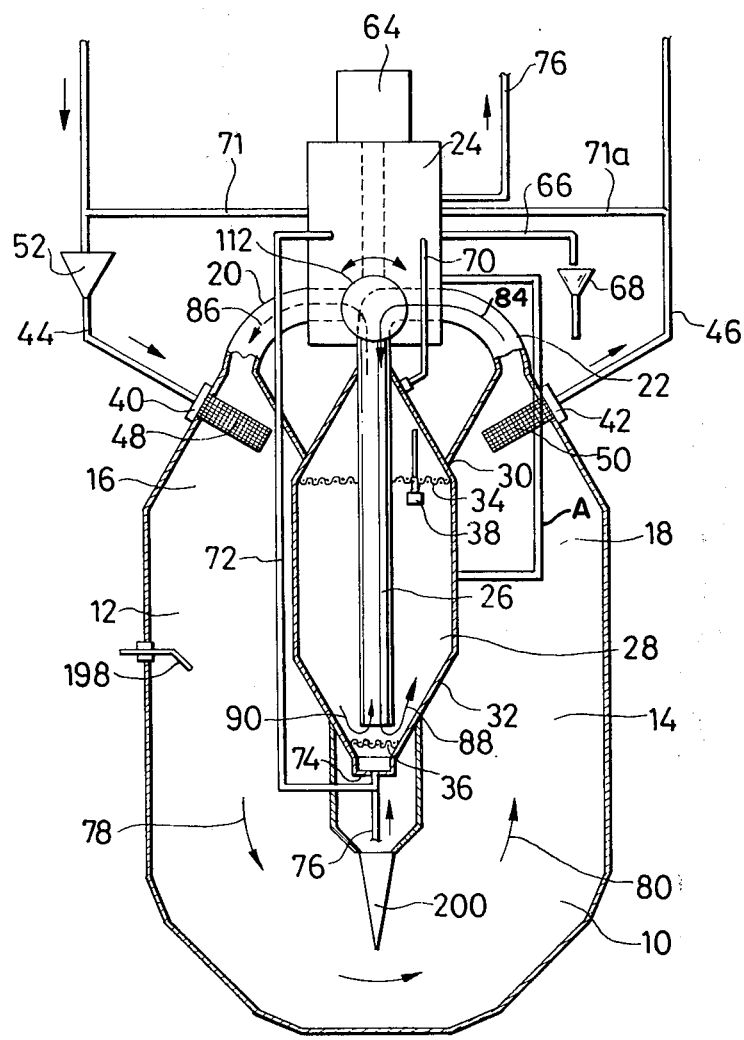

PROCESS AND INSTALLATION FOR THE TREATMENT OF WATER AND OTHER LIQUIDS

FIELD OF THE INVENTION

The present invention relates to a process and installation for the treatment, particularly softening, partially or fully desalting water, aqueous solutions, acids and the like, in which the liquid being treated is conducted through a resinous-bed ion exchanger, and in which the partially exhausted ion exchanger resin is removed from the bed in charges, regenerated by passing a regenerating material through the charge and re-entrained in the bed.

The treatment of natural or "raw" water in various arts by means of ion exchanger resins so as to obtain softened, partially desalted or fully desalted pure water through a fully automatic process is in itself known. However, in accordance with the intended utilization of the water, the preliminary or preparatory softening, partial or full desalting thereof is required in order to prevent sedimentation or the formation of deposits in water conducting installations, turbidity during washing and rinsing processes, precipitation during the preparation of solutions, and the like. It is further known that through the treatment of the water or an aqueous solution, exchanger resins which are saturated with hardening constituents, mineral salts, acids and the like, dependent upon need, are frequently required to be regenerated.

DISCUSSION OF THE PRIOR ART

Currently known processes and installations for the treatment of water have the drawback that, particularly for continual pure water needs, the required measures and installation are relatively complicated and expensive, and in which the required installation, in particular, covers a large surface area. Furthermore, for the supervision and control of the known installations there are needed expensive electronic measuring, indicating and control apparatus. Furthermore, the servicing operations connected with the processes may, notwithstanding partial automation of the known processes, only be carried out by highly trained and reliable personnel. It is also known that the ion exchanger resins may be withdrawn in charges from the exchanger resin bed and then to regenerate the resins. However, in none of the known installations is it possible that this chargewise withdrawal and regeneration may be effected without interrupting the pure water production for at least short periods of time. Consequently, in order to obtain an undisturbed operation, it is generally required to incorporate buffer or surge tanks for the pure water, which further increases the area or physical size of the installation. Since in all of the known installations the charge to be regenerated is withdrawn at the inlet end of the exchanger resin bed and re-entrained at the outlet end thereof, there is no guarantee that natural water will not seep into the pure water side. Additionally, the use of water is also extremely high, since the total water utilized for regeneration sequence runs off and thus cannot be reused.

SUMMARY OF THE INVENTION

The present invention accordingly provides for a process and installation for the treatment of water or aqueous solutions which avoid the above-mentioned disadvantages and drawbacks, which are simple, compact and inexpensive, and which in particular through fully automatic operation require practically no servicing.

This task is presently inventively solved in that the liquid which is to be treated is conducted at a vertical motion component from above downwardly into the inflow end, and with a vertical motion component from the bottom upwardly out of the outflow end of the resinous-bed ion exchanger, and in which the charges during the liquid treatment are removed from the bed at its outflow end and re-entrained at its inflow end.

Due to the cyclic withdrawal of charges of the ion exchanger resin at the outflow end at an upwardly directed outflow, there is achieved, on the one hand, the required loosening of the ion exchanger bed for the undisturbed operation of the process and, on the other hand, the possibility of continual withdrawal of pure water also during the partial regeneration of the resin. Electronic control devices may be largely dispensed with, since for the particular needs it is sufficient to employ relatively simple measuring apparatus for functional control. Thereby, each time the lengthiest loaded ion exchanger charge is withdrawn from the bed and regenerated. This periodically regenerated exchanger charge is then re-entrained in the bed at the water inflow side, so that the inflowing water constantly flows through a fully exchangeable ion exchanger.

In the inventive process the liquid is at least partially conducted from the bottom upwardly through the ion exchanger resin. This filtering from below upwardly affords a 100% utilization of the total ion exchanger bed while avoiding danger of deposit strand formations on the bed as is frequently encountered in prior art downwardly flowing filtering. In addition, relayering of the ion exchanger bed during withdrawal periods is completely prevented, without the need for taking special precautions. In particular, the impurities introduced by the natural water stream, as well as air and gas bubbles, are automatically removed from the ion exchanger bed. A further advantage of the upwardly directed filtering may be ascertained in that during lengthier withdrawal periods, there is no occurrence of the so-called salting of the treated water in the bed. In the known downwardly directed filtering, during longer static periods, salt is downwardly precipitated so as to lead to the so-called salting.

The inventive process is advantageously applicable not only to cation or anion-exchanger resins, but also to the so-called mixed beds of anion and cation exchanger resins. This is not possible with any of the known prior art processes.

Suitably, charges for regeneration are at times removed from the exchanger bed, having volumes which correspond to the maximum flow-through quantity for each hour, limited in a predetermined and automatic manner as, for example, by means of the predetermined volumetric extent of a regenerating container. The determination of this predetermined filling or volumetric extent may also be automatically obtained so as to avoid the need for highly trained service personnel in effecting this process.

The regeneration of a charge may be effected concurrently with the continuous treatment of the liquid streaming through the bed whereby, independently of the regeneration of the partly withdrawn resin, pure water may be continually removed under constant pressure.

The regeneration of a charge is advantageously carried out so that the regeneration medium is conveyed from below upwardly through the ion exchanger resin. This affords presently the same advantages as discussed above with regard to the exchanger bed.

The invention further provides an installation for carrying out the inventive process, including a filter container having a resinous-bed ion exchanger therein which has an inlet communicating with an inflow conduit and outlet communicating with an outflow conduit; a regenerating container communicating with the filter container; and a fully automatic control arrangement for the charge-wise transfer of the ion exchanger resin from the filter container into the regenerating container, and back. Inventively, this installation is distinct in that the filter container is of a U-shaped configuration and is positioned so that the inflow conduit and the outflow conduit each connect into a frusto-conically shaped upper end portion of the filter container and are closed off by filters preventing passage therethrough of the ion exchanger resin, and in which passageways lead from the upper end of the filter container towards two openings in a three-way selector valve which is connected with the control arrangement, and whose third opening communicates with the regenerating container.

The U-shaped configuration of the filter container is extraordinarily compact inasmuch as the overall height of the installation in comparison with known arrangements is cut practically in half. This shape and arrangement with both arms of the U-shape extending upwardly, provide the above-mentioned advantageous through-flow of the ion exchanger resin bed from below thereof upwardly in at least a second portion of the filter container, and provide the therewith connected advantages. The small spatial requirements of the installation are still further enhanced by the proximate positioning of both ends of the filter container and the conduits and passageways which are connected therewith.

The regenerating container in accordance with this embodiment is suitably formed into a cylindrical shape having frusto-conical ends, having a dip tube inserted therein from the top thereof and extending substantially through the full height of the container, and in which the upper end of the dip tube is connected with the three-way selector valve. The frusto-conical configuration of the ends of the filter container and of the regenerator container permits a uniform transfer of the instant resin charge into the regenerating container and from there back into the filter container, without requiring pumps or the like for the transfer since, in view of the dip tube positioning within the regenerating container, the pressure differential between the filter container subjected to the pressure of the outflowing pure water and the pressureless regenerating container at a predetermined adjustment of the three-way selector valve is sufficient for the transfer of the resin charge from the outlet zone of the filter container into the regenerating container.

The cylindrical portion of the regenerating container is preferably transparently formed, or provided with a viewing glass, so as to permit external observation of the regenerating process.

In order to facilitate the fully automatic implementation of the inventive process, the control arrangement, which may be formed as a flow-through control apparatus, is connected by means of suitable conduits with the upper and lower ends of the regenerating container, as well as with a drain and with a section of the inflow conduit upstream of a differential pressure regulator, connected on the one side with a regenerating means supply and, on the other side, through a suitable conduit with the lower end of the regenerating container and through a further conduit with the outflow conduit for the pure water. By means of these connecting capabilities, the flow-through control apparatus is adapted to control the collective steps of the regenerating process in a simple manner, for example, through the programmed opening and closing of valves located intermediate the individual conduits, and through programmed positioning of the three-way selector valve.

In order to facilitate the introduction of each charge into the regenerating container, and the subsequent passing through the charge of regenerating means and washing water, in a further proposal according to the invention there may be provided intermediate the inlet of the conduits connected to the lower end of the regenerating container and the lower end of the dipping tube, as well proximate to the upper end of the regenerating container, a sieve or diaphragm plate adapted to prevent the passing therethrough of the ion exchanger resin. The resin charge consequently may only enter the region between both sieve or diaphragm plates, but not into the connecting conduits for the regenerating means or for the water.

In order to obtain the precise and automatic determination of the correct filling extent of the regenerating container, there may be located on the upper sieve or diaphragm plate a level switch indicative to the through-flow control apparatus of the filling of the regenerating container with the ion exchanger resin. Upon emanation of a signal by the level switch, the further introduction of ion exchanger resin into the regenerating container is prevented by the control apparatus.

A particular advantage of the inventive installation may be ascertained in that the control of the entire program sequence by the flow-through control apparatus may be achieved with the aid of a single, by a preselected value-control signal actuated electrical indexing member. The signals or current flow to the indexing member due to setting means causes displacement thereof through a step so as to, through this displacement, cause the flow-through control apparatus initiate the next step in the process sequence or program. These operations are obtained in a fully automatic manner.

In a particularly purposeful embodiment, the flow-through control apparatus is provided with valve connections which, together with the three-way selector valve, are so controllable by the indexing member, whereby the following operating cycle may be automatically effected:

a. regenerating pause
b. regenerated exchanger resin charge reconveyed into the filter container
c. withdrawing exchanger resin charge from the filter container
d. when utilizing a mixed exchange resin bed, unmixing the charge
e. regenerating the separated resins of the charge, in effect, utilizing only the exchanger type for the charge
f. washing out regenerating means from the charge
g. again intermixing the separated resins when utilizing a mixed resin bed
h. again washing the charge when utilizing a mixed resin bed.

Other exemplary applications of the inventive process are, for example, the de-ironing of caustic acid or chromic acid, particular selective processes and the like.

In order to provide for the introduction of the regenerating means into the lower end of the regenerating container, there is preferably provided a natural gravitational flow from the regenerating means supply toward the regenerating container, or there may be provided a radial aspirator or pump.

In this preferred embodiment of the inventive installation, the entire water treating process is carried out in a closed, pressurized system. The primary side inlet pressure of the water to be treated should be at least approximately 15 meters of water column. A suitable differential pressure regulator preset for the system, for example, a minimum-pressure valve provides, on the secondary side, constant pressure differential relationships for the entire operative sequence. Additional pressure generating pumps or converter pumps are not required in the entire installation. This further provides for an extremely important advantage of the invention.

By means of the washing out of the regenerating means from the regenerated resin charge first from below upwardly and then subsequently from the top downwardly, there is provided by a simple reversal of the conduit connections, a presently greatly improved washing out of the regenerating means residuals in comparison with known processes. Through the upwardly directed stream of the regenerating means itself, eventual dirt particles, as well as air and gas bubbles within the resin charge are conducted, due to the specific weight of the regenerating means, through the upper sieve or diaphragm plate to the drain of the system.

After removal of a predetermined quantity of treated water, there automatically follows a further regenerating cycle. The initiation of a new regenerating cycle may, however, be manually terminated at any time.

In another aspect, there is also provided the possibility that the course of the regenerating cycle may be controlled in response to a predetermined physical property of the natural or raw water, for example, its conductivity or the like. For this purpose, there may be provided a measuring probe in the inflow zone of the filter container which, for example, is attached to a preset value measuring and control apparatus connected to the flow-through control apparatus, and which will emanate a cycle stopping signal upon transition through a predetermined limiting value.

The measuring probe may, in an advantageous embodiment of the invention, be rotatably mounted in a wall of the filter container and subtend an angle of approximately 45° with the interior of the filter container. This will permit the zone of the measuring extent to be selected in a stepless manner, within which the measuring probe is rotated.

With respect to the regenerating means, the present invention provides for a further advantage in that not only is there provided for the optimum utilization of the regenerating means by the conveyance thereof from the bottom upwardly, but also the application of the regenerating means (NaCl, HCl, $H_2SO_4$, NaOH and the like) in a saturated solution, in effect, in a manageable concentration, so as to automatically effect the thinning out of the regeneration means. The regenerating means requirement for the inventive process corresponds approximately to the theoretical stoichiometric value. Consequently, the foregoing deals with an extremely efficient regeneration.

The filter output is extraordinarily increased by the inventive process, whereby weight rate of flow velocities are obtainable to the extent of 100 meters per hour and greater.

The flow-through control apparatus with a single indexing member is in a position to locate the collective control tasks of the installation full-automatically into their required correct operative sequence. This, in comparison with known installations, provides for savings of a number of, in particular instances up to twenty and more, possibly interrupted magnet, motor-or pneumatic valves.

In order to provide for an equal pushing of the exchanger resin filling into the filter container upon sequential withdrawal of resin charges, in a further proposal according to the invention, the lower reversing region of the U-shaped filter container may include a guide or baffle surface fastened to the upper wall cross-section of the filter container and projecting downwardly into the interior of the filter container. Through this reversal of the movement of the resin, adherence of the resin is prevented to the lower U-shaped region.

In the inventive installation it is further extraordinary advantageous that the input of the regenerating means and washing water may also be effected in a fully automatic manner. However, in order to avoid blindly controlling the charge-wise regeneration process, which may be associated with an excessively large use of the regenerating means and washing water, it is practical to provide a measuring and regulating arrangement associated with the flow-through control apparatus, and having a measuring probe positioned in the regenerating container which, upon transition beyond a preset measuring value, for example a predetermined conductivity or other physical properties of the liquid, emanates a signal to thereby interrupt the further input of regenerating means or washing water.

For the full desalting of water there may be provided a mixed exchanger resin bed, which contains anion as well as cation exchanger resin. In this instance, the regeneration process becomes somewhat more complicated, but still may be effected in accordance with the same basic operative principle. In order to effect the regeneration of a mixed charge of anion and cation exchanger resin, the regenerating container preferably is provided at approximately one-half of its height with an intermediate outlet conduit which is connected with the flow-through control apparatus, and the valve connections of the flow-through control apparatus together with the three-way selector valve are so controllable by means of the indexing element, whereby the mixed charge is next separated by the introduction of an upwardly directed water stream, and in which the anion exchanger resin is collected in the lower portion of the regenerating container. Thereby, through the particular connection of the attached conduits by means of the valve connections provided for this purpose in the flow-through control apparatus, at first the anion exchanger resin in the upper portion and subsequently the cation exchanger resin in the lower portion of the regenerating container are separated from each other and separately regenerated in a manner similar to that as has been described previously with respect to a particular exchanger resin. Prior to reconveyance into the filter container, oil-free pressurized air is introduced from below into the regenerated exchanger resin, so as to thereby obtain a complete mixing-through of both resin types. This somewhat complicated regeneration process may also be, in a predetermined manner, fully automatically effected. The primary distinction merely lies in that the flow-through control apparatus contains in lieu of, for example eight valves, as used in a regeneration process for a simple exchanger resin, seventeen valves for this program. The three-way selector valve in the lower portion of the flow-through control apparatus need not be modified in comparison with the simple program.

While normally raw or natural water, in effect, pre-supplied pure water is utilized for the washing out and displacement of the regenerating means and the regenerated resin from the regenerating container, as above described, it is also possible that the outlet of the filter container may be interconnected with the flow-through control apparatus for the input of driving, fully treated water into the regenerating container.

BRIEF DESCRIPTION OF THE DRAWING

Having reference to the single FIGURE of the drawing there is now illustrated a flow schematic representation of an exemplary embodiment of the invention.

DETAILED DESCRIPTION

The flow schematic in the drawing discloses a generally U-shaped filter container 10 having upstanding generally cylindrical side wall portions 12 and 14, as well as frusto-conical upper ends 16 and 18, which extend into laterally inwardly bent channels 20 and 22. During operation, the filter container 10 is filled with an ion exchanger resin. The channels 20 and 22 are, in a not more detailed described manner, introduced into a flow-through control apparatus 24 which is per se known in principle. By means of a three-way selector valve 112 located in the lower portion of the flow-through control apparatus 24, there may be formed a flow connection with the upper end of a dip tube 26, the latter of which is introduced into a regenerating container 28 at the upper end thereof and extends almost to the lower end of the container. The regenerating container 28 is generally cylindrically formed and, similar to the filter container, includes frusto-conical upper and lower ends 30 and 32. Between the cylindrical main portion and the upper frusto-conical end 30, there is positioned interiorly of the regenerating container 28 a sieve or diaphragm plate 34 which will prevent the passage therethrough of the exchanger resin. A similar sieve or diaphragm plate 36 is located between the lower end of the dip tube 26 and the lower end of the regenerating container 28. At the lower surface of the upper sieve or diaphragm plate 34 there is further provided a level switch 38 adapted to be actuated upon sensing a predetermined level of filling of the space between both sieve or diaphragm plates of the regenerating container 28 with an ion exchanger charge.

In the frusto-conical ends 16 and 18 of the filter container 10 there is formed, respectively, an inlet 40 and an outlet 42, communicating respectively with an inlet conduit 44 and outlet conduit 46. Interiorly of the filter container 10, the inlet 40 and outlet 42 are each closed off by filters 48 and 50 which prevent the flow therethrough of the ion exchanger resin and whereby only the liquid being treated can flow through the inlet and outlet.

A differential pressure regulator 52 is located in the inlet conduit 44 so as to provide for a constant operative pressure on the secondary side. An electrical indexing member 64 is mounted on the upper end surface of the flow-through control apparatus 24, and through whose actuation various sequential operative control functions are imparted to the installation.

The flow-through control apparatus 24 is connected by means of a conduit 66 with an outlet or drain 68, through a conduit 70 with the upper end 30 of the regenerating container, through a conduit 71 with a zone of the inlet conduit 44 lying upstream of the differential pressure regulator 52, through a conduit 71a with the outlet conduit 46, through a conduit 72 with the lower end 74 of the regenerating container 28 at a point below the sieve or diaphragm plate 36, and through a conduit 76 with the lower end 74 of the regenerator container. In a not more specifically detailed manner, the flow-through control apparatus 24 may be further connected to a suitable regenerating means supply (not shown).

The liquid to be treated, or the natural, raw water, flows through the differential pressure regulator 52 into the inlet 40, flows in the direction of the arrow 78 and 80 through the U-shaped filter container 10, the latter of which contains the ion exchanger resin, exits from the filter container through the outlet 42. Through the outlet conduit 46 the obtained pure water is conducted toward its intended utilization purposes. In the right-hand section 14 of the filter container 10, the water streams from the bottom thereof upwardly through the resin bed so as to provide for the above-mentioned advantages.

In order to initiate the regeneration cycle, the three-way selector valve 112 of the control apparatus 24 is operatively positioned in a manner by the indexing member 64 so that the passageway from channel 22 is opened with respect to the dip tube 26. Further, the conduit 70 is then connected with the outlet drain 68. Between the outlet zone 18 of the filter container 10 and the interior of the regenerating container 28 there occurs a considerable pressure drop, whereby the exhausted exchanger resin present in that zone are conveyed through passage 22 and dip tube 26 in the direction of arrows 84 and 88 into the regenerating container 28. As soon as the level of resin filling in the regenerating container 28 reaches the level switch 38, the latter conveys an indicating signal to the indexing member 64, whereby the latter is again actuated. Due to this actuation, the channel 22 is again closed so that no further resin may be conveyed into the regenerating container 28. Concurrently, the passageway from the regenerating means supply leading to the conduit 76 in the lower end of the regenerating container is opened, whereby regenerating media may flow through into the latter from the bottom upwardly through the resin charge contained in the regenerating container. Concerning the foregoing, it is advantageously useful that the natural gravitational flow or drop of the regenerating means toward the regenerating means container be utilized. In lieu thereof, there may also be employed a radial aspirator or a pump which similarly may be automatically actuated by the control apparatus. Automatically, the indexing member 64 is again actuated, in view of which the conduit is again closed, and the inflow of further regenerating means interrupted. Concurrently, there is opened a passage for the flow of raw water from the conduit 71, or pure water from the conduit 71a, into the conduit 72 and consequently toward the lower end 74 of the regenerating container. The water thus flows from below into the regenerating container 28 and displaces the regenerating means contained in the resin charge toward the upper portion of the container, and through the conduits 70 and 66 into the drain or outlet 68. Concurrently, the regenerating means is thereby washed out of the resin charge.

Upon the sequential automatic actuation of the indexing element 64, raw water or pure water is introduced into conduit 70, and conduit 72 is connected with conduit 66 and thereby with drain or outlet 68. In that manner, the flow direction of the resin charge is reversed, and the residual regenerating means is effectively washed out therefrom.

Upon completion of this process, the indexing member 64 is again actuated, in view of which the conduit at the lower end 74 of the regenerating container which connects with the drain 68 is again closed, and the channel 20 from the dip tube 26 into the inlet zone 16 of the filter container 10 is opened by means of three-way selector switch 112. As a result, the resin charge contained in the regenerating container 28 is conveyed by the pressure of the water flowing into the upper end 30 from conduit 71 or 71a in the direction of arrows 86 and 90 into the inlet zone of the filter container 10.

After completion of this sequence, the indexing member 64 is again actuated whereby the channel 20 is closed. In order to measure the conductivity or any other physical values of the resin contained interiorly of the filter container 10, a measuring probe 198 may be rotatably mounted in the wall of the portion 12 of the filter container 10 so as to extend at an angle relative to its interior of 45°, and which is connected with the indexing element 64. Through this measuring probe the commencement of a new regenerating cycle may be terminated as soon as a preset value for the conductivity, or a particular impurity level, is exceeded.

In the lower reversing or bending region of the U-shaped filter container 10, there is located a conducting surface 200 supported in the upper wall section of the filter container and which extends downwardly interiorly of the filter container. This permits for a balanced further movement of the ion exchanger resin during the withdrawal and charging, and will effectively prevent adherence thereof to the surface of the container.

While there has been shown what is considered to be the preferred embodiment of the invention, it will be obvious that modifications may be made which come within the scope of the disclosure of the specification.

What is claimed is:

1. In an ion exchange process for the treatment of liquids, in a U-shaped container forming a resinous-bed ion exchanger having an inlet aperture connected to an inflow conduit and an outlet aperture connected to an outflow conduit a differential pressure regulator in said inflow conduit, a cylindrical regenerating container having frusto-conical ends being connected to said container, and an automatic control installation to effect conveyance of charges of ion exchanger resin upwardly from the bed in said U-shaped container to said regenerating container and re-entrain resin charges from the regenerating container to the first-mentioned container, comprising the steps of conducting the liquid being treated through said resinous-bed ion exchanger; withdrawing portions of exhausted ion exchanger resin in charges from said bed to said regenerating container; regenerating said withdrawn resin by conducting a regenerating medium through each of said withdrawn charge; and reentraining each of said regenerated resin charge in said bed, the improvement comprising: conducting said liquid being treated with a vertical motion component from above downwardly into an inflow end above said bed and through said bed with a vertical motion component from below upwardly out of an outflow end above said bed; conducting said regenerating medium from below upwardly through said charge during regeneration of the latter; withdrawing said charges during treatment of said liquids in the bed from the outflow end of said bed; premeasuring and automatically limiting the volume of said charges withdrawn from said bed for regeneration in conformance with a predetermined maximum hourly flow volume through said resinous bed, and re-entraining said charges at the inflow end of said bed.

2. A process as claimed in claim 1, comprising conducting said liquid being treated through said bed constituted of an anion and cation exchanger resin admixture.

3. In an ion exchange installation for the treatment of liquids including a container forming a resinous-bed ion exchanger, said container having an inlet aperture connected to an inflow conduit and an outlet aperture connected to an outflow conduit; a differential pressure regulator in said inflow conduit; a regenerating container connected to the container, said regenerating container being cylindrical and having frusto-conical end portions; and an automatic control installation adapted to effect conveyance of charges of ion exchanger resin from said bed in the container into the regenerating container and re-entraining regenerated resin charges from said regenerating container into said container; the improvement comprising; said container being U-shaped and having upstanding arm portions including frusto-conical upper ends, said inflow and outflow conduits being each connected to one of said frusto-conical upper ends of the container; filters in each of said conduits preventing flow therethrough of the ion exchanger resin; a three-way selector valve connected with said control installation, upper ends of the container communicating with channels extending to two openings in said three-way selector valve and a third opening in said selector valve communicating with said regenerating container; a hollow dip tube projecting into said regenerating container downwardly from the upper end thereof and extending through substantially the entire vertical height of said container, said dip tube having the upper end thereof in selective flow connection with the three-way selector valve; said control installation comprising a flow-through control installation, a plurality of conduits connecting said control installation with the upper and lower ends of said regenerating container, with a drain and with a section of said inflow conduit upstream of said differential pressure regulator, a conduit connected on the one side of a regenerating medium supply and on another side through a conduit connected with the lower end of said regenerating container, and a conduit communicating with a pure water outflow conduit.

4. An installation as claimed in claim 3, the cylindrical portion of said regenerating container being transparent.

5. An installation as claimed in claim 3, comprising sieve plate means positioned intermediate the ends of the conduits connected with the lower end of the regenerating container and the lower end of the dip tube; and an upper sieve plate means proximate the upper end of said regenerating container adapted to prevent flow therethrough of said ion exchanger resin.

6. An installation as claimed in claim 5, comprising level switch means fastened to said upper sieve plate means, said level switch means being adapted to provide indication to said control installation of the level filling of the regenerating container with ion exchanger resin.

7. An installation as claimed in claim 3, said flow-through control installation comprising an electrical indexing control element.

8. An installation as claimed in claim 7, comprising means in said regenerating container for the regeneration of a mixed charge of anion and cation exchanger resin, said means including a conduit at approximately the mid-height of said container and being connected with the flow-through control installation, said flow-through control installation being adapted to be actuated by said indexing control element; means for separating the mixed resin charge through an upwardly directed stream of water; means for separately regenerating said anion exchanger resin and said cation exchanger resin in respectively the upper and the lower sections of said regenerating container; and means for admixing the separated regenerated resins, said admixing means introducing oil-free pressurized air through the lower portion of said regenerating container.

9. An installation as claimed in claim 8, the outflow of said container adapted to be connected with the flow-through control installation for introducing fully-treated water into said regenerating container.

10. An installation as claimed in claim 3, comprising measuring probe means in the inflow region of said container, said measuring probe being operatively connected with said flow-through control installation, the probe being rotatably mounted in a side wall of the container and extending interiorly thereof at an angle of approximately 45°.

11. An installation as claimed in claim 3, comprising a conductive guide surface located in the lower bent interior portion of said U-shaped container, said guide surface being supported from an upper wall portion of the container and extending downwardly into said container.

12. An installation as claimed in claim 3, the cylindrical portion of said regenerating container comprising a looking glass.

* * * * *